United States Patent
Yamada et al.

(10) Patent No.: US 6,793,027 B1
(45) Date of Patent: Sep. 21, 2004

(54) HYBRID DRIVE SYSTEM

(75) Inventors: Toshiaki Yamada, Iwata (JP); Mikio Saito, Iwata (JP)

(73) Assignee: Yamaha Hatsudoki Kabushiki Kaisha, Shizuoka (JP)

(*) Notice: Subject to any disclaimer, the term of this patent is extended or adjusted under 35 U.S.C. 154(b) by 38 days.

(21) Appl. No.: 09/830,820

(22) PCT Filed: Aug. 24, 2000

(86) PCT No.: PCT/JP00/05660
§ 371 (c)(1),
(2), (4) Date: Apr. 27, 2001

(87) PCT Pub. No.: WO01/15929
PCT Pub. Date: Mar. 8, 2001

(30) Foreign Application Priority Data

| Aug. 27, 1999 | (JP) | 11-240791 |
| Aug. 30, 1999 | (JP) | 11-242557 |
| Aug. 31, 1999 | (JP) | 11-246493 |

(51) Int. Cl.[7] .............................. B50K 1/00
(52) U.S. Cl. .............................. 180/65.1
(58) Field of Search .............................. 180/65.1, 65.2, 180/65.3, 65.8; 429/12

(56) References Cited

U.S. PATENT DOCUMENTS

| 4,961,151 A | * | 10/1990 | Early et al. ........... 180/65.8 |
| 5,193,635 A | | 3/1993 | Mizuno et al. |
| 5,528,148 A | * | 6/1996 | Rogers ................ 324/426 |
| 5,631,532 A | * | 5/1997 | Azuma et al. ........... 320/5 |
| 5,780,980 A | | 7/1998 | Naito |
| 5,820,172 A | * | 10/1998 | Brigham et al. ....... 180/65.4 |
| 5,847,520 A | * | 12/1998 | Theurillat et al. ...... 318/139 |
| 5,892,346 A | * | 4/1999 | Moroto et al. ......... 318/139 |
| 5,898,282 A | * | 4/1999 | Drozdz et al. ........ 318/139 |
| 5,929,595 A | * | 7/1999 | Lyons et al. .......... 320/104 |
| 5,941,328 A | * | 8/1999 | Lyons et al. .......... 180/65.1 |
| 6,091,228 A | * | 7/2000 | Chady et al. ......... 320/132 |

FOREIGN PATENT DOCUMENTS

| EP | 592319 | * | 4/1994 | ........... 180/65.1 |
| JP | 2168802 | | 6/1990 | |
| JP | 3284104 | | 12/1991 | |
| JP | 6253409 | | 9/1994 | |
| JP | 10117406 | | 5/1998 | |
| JP | 2000173675 | | 6/2000 | |

OTHER PUBLICATIONS

International Search Report for International Application No. PCT/JP00/05660, Nov. 14, 2000 (with English translation).

*Automotive Engineering International*, Mar. 2001, pp. 27–37, 64–70, 72–80.

\* cited by examiner

Primary Examiner—Frank Vanaman
(74) Attorney, Agent, or Firm—Knobbe, Martens, Olson & Bear, LLP

(57) ABSTRACT

A hybrid-driven device includes an electric power storage device and a fuel cell. The hybrid-driven device can be a vehicle such as a motorcycle, scooter, watercraft, an automobile, and the like. The electric power storage device, such as a battery, and a fuel cell, can be formed into independent unitary modules, each having a controller. Each of the modules can be removably mounted as a unit to the vehicle. Additionally, each independent module can include sensors for detecting a state of the respective module. Each module can also include memory for storing data gathered by the sensors. The vehicle can also include a controller which controls the electrical power storage device and the fuel cell to provide smooth operation of the device.

15 Claims, 8 Drawing Sheets

HYBRID DRIVE SYSTEM

This application is based on and claims priority to PCT/JP00/05660, filed Aug. 24, 2000, Japanese Patent Application No. 11/240791 filed Aug. 27, 1999, Japanese Patent Application No. 11/242557 filed Aug. 30, 1999, and Japanese Patent Application No. 11/246,493 filed Aug. 31, 1999, the entire contents of which is hereby expressly incorporated by reference.

BACKGROUND OF THE INVENTION

1. Field of the Invention

This invention relates to a hybrid-driven device with a battery and a fuel cell as power sources of a drive motor for mobile devices such as vehicles, watercrafts, and the like.

2. Background Art

A hybrid type electric car has been developed for the purpose of reducing pollution generated by vehicles, which includes an electric motor for driving the vehicle. Two kinds of batteries, for constant speed running and high output running, are combined as power sources of the vehicle to increase travel distance for each charge and to provide efficient and stable power supply during constant speed running and high output running, such as acceleration. In such a hybrid-driven vehicle, a system has been contemplated in which methanol is used as primary fuel, and a fuel cell is used as a power supply source. This system includes a reformer and a shift reactor for processing carbon monoxide, and a secondary battery in addition to the power supply source, such as a lead battery, for carrying peak load. In such a hybrid-driven vehicle, a vehicle controller is provided for controlling the motor in an optimum condition by supplying electric power efficiently in response to the operating conditions after actuation of the power source. Modules constituting equipment such as a motor, a fuel cell and a battery are provided with sensors for detecting data, such as temperature, rpm or a state of the voltage and current, corresponding to the modules necessary for drive control of the vehicle, respectively. The vehicle controller calculates required electric power or expected travel distance according to the detected output, for charging/discharging of the battery and the fuel cell, and drive control of the motor, or the like.

In constructing such a control system, it is desirable for each module to be easily installed into the vehicle and so as to provide easy parts replacement including that of related control system parts, for improved application of modules, and also to receive reliable control data, for more reliable control.

In driving a vehicle using two power sources such as a battery and a fuel cell described above, the vehicle controller calculates expected travel distance from the data on the residual amount of power source capacities and fuel in the normal operating conditions of both power sources, makes an effective use of the power sources during running while verifying reliable travel to the destination. The controller also makes proper use of the power sources, such as supplementary use of the battery to compensate for the delayed output response of the fuel cell during acceleration, so as to perform drive control of power sources through their controllers, for constant stable running.

However, if an abnormality occurs in the battery or the fuel cell, continuous use of the power sources might disable drive control based on the data from the power source controller, preventing stable running, and the abnormal state might expand more widely due to delayed measures against the abnormality, causing damage to other sections.

In view of the foregoing, it is a first object of this invention to provide a hybrid-driven vehicle capable of effecting improved efficiency of assembly and maintainability of modules forming a power system such as a motor and power supply sources such as a fuel cell and a battery, as well as reliable control.

In addition, it is a second object of this invention to provide a hybrid-driven vehicle in which the states of two power sources are detected during operation to calculate an approximate vehicle range based on the detection data, and the states of power sources are monitored constantly during operation such that the vehicle is able to travel smoothly to the destination.

Further, it is a third object of this invention to provide a hybrid-driven vehicle in which in the event that an abnormality is detected in either of the two hybrid drive power sources, the use of the power source is stopped promptly to prevent expansion of the abnormal state so as to cope with the abnormality immediately. Operation is continued using the other power source, for smooth drive control of the power system.

SUMMARY OF THE INVENTION

In order to achieve the foregoing first object, a first aspect of the invention includes a hybrid-powered vehicle having a first and a second power supply source, a main switch for switching on the power sources, and a device controller for controlling the device, wherein said power system and said first and second power supply sources are formed as integrated module units, respectively, each module unit is provided with a module controller a sensor for detecting the state of the module, and a sensor configured to store data indicative of the detected state.

In this arrangement, equipment constituting the power system such as a motor, the first power supply source such as a fuel cell and the second power supply source such as a battery, are arranged as module units such as a motor unit, a fuel cell unit and a battery unit, respectively, to be combined integrally together with related equipment and components, and incorporated unit by unit in a device such as a vehicle. The module units contain module controllers for controlling the respective modules. The module controllers have memory for storing detection data from state detection means of the modules, so that each module unit is able to perform data communication with the device controller.

By arranging the motor, fuel cell and battery as module units containing controllers, respectively, efficiency of assembly work and maintainability of modules are improved. Additionally control systems corresponding to the modules are integrated for the respective modules, thereby providing improved reliability of the control, easy parts replacement including that of the control system parts and improved applicability of modules with effective parts control.

In a preferred arrangement, the device controller is adapted to perform bidirectional data communication with the module controllers.

In this arrangement, data is stored in each module controller. The device controller can receive requisite data on request to the module controller. Thus, the memory structure is simplified on the device controller side and effective control can be performed on the same communication line for each module.

In another preferred arrangement, after a predetermined time has elapsed from a time when the main switch is turned off, preparation processing is performed on said first or said second power supply source for the next operation.

In this arrangement, after a predetermined time has elapsed from a time when the main switch is turned off, it is determined whether the capacity of the power supply source is optimized sufficiently for normal operation. Optionally when operation is stopped and the main switch is turned off, residual capacity of the first or the second power supply source is detected. Then, capacity-up processing is performed at a time earlier than the time of the next driving schedule entered by the user by a length of time necessary to increase the detected residual electric capacity up to an optimum value. Thus, the device can be held on standby in an optimum condition such that operation can be started stably and reliably at the time of next running for continued normal operation.

In addition, in order to achieve the second object, another aspect of this invention may provide a hybrid-powered vehicle with a first and a second power supply source as power sources for driving the vehicle, wherein an available amount of power supply by each of said first and said second power supply source is detected, and a controller is configured to calculate an approximate vehicle range from the available amount of power supply.

In this arrangement, during operation, the available amount of power supply of each of the first and the second power source, for example, residual capacity or residual fuel, is detected and the approximate vehicle range is calculated on the basis of the detected data. Thus, stable operation to the destination is verified and a prompt action can be taken when the approximate vehicle range or the residual quantity is insufficient.

In a preferred arrangement, this aspect of the invention is characterized in that said first power source is a fuel cell and said second one a battery. The fuel consumption ratio of the fuel cell and the capacity consumption ratio of the battery are calculated, and the approximate vehicle range is calculated on the basis of these consumption ratios. If said residual fuel of the fuel cell and said residual capacity of the battery are not more than the respective predetermined setting values, warning is indicated.

In this arrangement, the hybrid power source preferably comprises a fuel cell and a battery (secondary battery). The fuel consumption ratio of the fuel cell is calculated from the traveled distance and the fuel consumption, and the approximate vehicle range by the fuel cell is calculated from the fuel consumption ratio and the residual amount of fuel. Further, the capacity consumption ratio of the battery is calculated from the traveled distance and the voltage drop of the battery or the capacity consumption of the whole vehicle, and the approximate vehicle range is calculated from the capacity consumption ratio and the residual capacity. In this case, if the residual fuel and the residual capacity of the battery are not more than the respective predetermined values, warning is indicated and appropriate measures can be taken such as refueling and battery change, or charging.

In still another preferred arrangement, this aspect of the invention is characterized in that the characteristic data of capacity corresponding to the current and voltage of the battery is provided beforehand. The battery capacity is calculated from the detection data on the current or voltage of the battery, based on the characteristic data of capacity.

In this arrangement, the characteristic data of capacity corresponding to the current and voltage of the battery is stored beforehand in a ROM, etc. When the current or voltage of the battery is detected, the battery capacity (residual capacity) at the time of detection is calculated from the stored characteristic data of capacity, based on the detection data.

In another preferred arrangement, this aspect of the invention is characterized in that after a predetermined time has elapsed after a first detection data is obtained on said current or voltage, a second detection data is obtained on the current or voltage. The impedance is calculated from the calculated capacity value based on the first and the second detection data.

In this arrangement, after a predetermined time has elapsed after the battery capacity and the impedance are calculated on the basis of the first detection data, the capacity and the impedance are calculated on the basis of the second detection data. The state of discharge of the battery is identified from the impedance change. Taking account of this impedance change, the approximate vehicle range can be calculated on basis of the residual capacity of the battery.

Further, in order to achieve the third object, a further aspect of the invention can include a hybrid-driven device having a first and a second power supply source as power sources of a power system for driving the device. The first and second power supply sources are connected to said power system through first and second switches, respectively. A device controller is configured to control the device according to the operating conditions. The first and second power supply sources also have controllers, respectively. The controllers are adapted to detect abnormalities of the power supply sources and to store the detection data on abnormality. The device controller is adapted to perform bidirectional communication with the controllers of the power supply sources to send/receive data or commands, and to cut off the power supply source from said power system through the switches when said device controller receives said detection data indicating an abnormality.

In this arrangement, the device controller which controls the whole device is adapted to perform data communication with controllers of the power supply sources. If an abnormality occurs in any of the power supply sources and the abnormality is detected by its controller, the detection data is sent to the device controller, and the device controller determines which supply source the abnormality happens in, and cuts off the abnormal power supply source from the power system through the switches such as a relay. Thus, the use of the abnormal power source is stopped promptly and operation is continued using the other power source while an appropriate action is taken against the abnormality, thereby minimizing damage.

The abnormality of the power supply source can be detected by detecting the temperature and current or voltage of each power supply source. These values are determined to be abnormal when these values exceed the respective proper ranges. If such an abnormal state is detected, the detection data on the abnormality is stored in the controller of the abnormal power source and sent from the controller to the device controller on request.

In a preferred arrangement, this aspect of the invention is characterized in that the controller of each power supply source sends to said device controller a request signal for stoppage of discharging of the power supply source upon detection of abnormality of the power supply source. When the controller receives the request signal, the device controller cuts off the power supply source from said power system through the switches.

In this arrangement, the controller of each power supply source sends a signal requesting stoppage of discharging to stop the use of the power source upon detection of abnormality of the power source. The device controller which received the request signal for stoppage of discharging determines which power source the signal was sent from, and cuts off the power source from the power system through the switches occurs. Thus, when an abnormality occurs in a power source, a command can be requested for stopping the use of the power source, from the abnormal power source side, through communication between the controllers of the power sources and the device controller, providing a prompter action to cope with the abnormality. The request signal for stoppage of discharging may be simply the detection data on abnormality. In this case, if an abnormality is detected, the detection signal is sent to the device controller, and the device controller cuts off the abnormal power source accordingly.

DETAILED DESCRIPTION OF THE PREFERRED EMBODIMENTS

Now, an embodiment of this invention will be described below with reference to the drawings.

Figure 1:
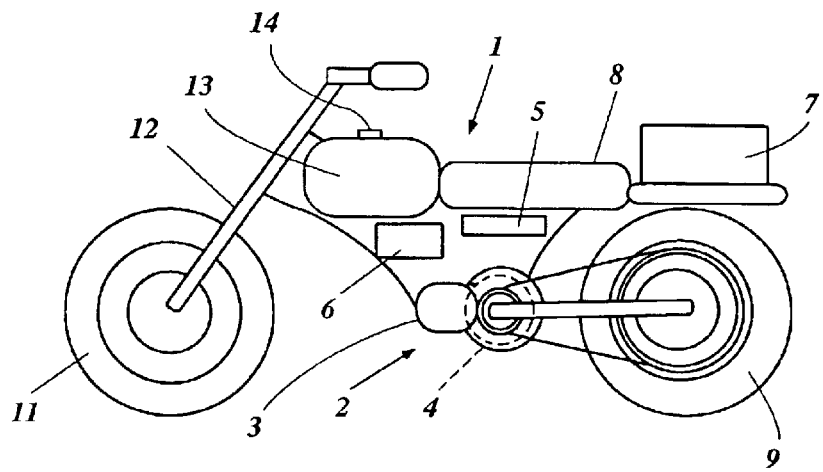
FIG. 1 is a side elevational view of a hybrid-driven vehicle according to an embodiment of this invention.

FIG. 1 is a general structural view of a hybrid-driven vehicle according to an embodiment of this invention. The hybrid-driven vehicle 1 of this embodiment is applied to a motor bicycle. The hybrid-driven vehicle 1 is provided with a hybrid-driven system 2. The hybrid-driven system 2 comprises an electric motor unit 3, a transmission 4, a vehicle controller 5, a battery unit 6 and a fuel cell unit 7.

The fuel cell unit 7, comprised mainly of a fuel cell and a reformer, is disposed rearwardly of a seat 8 and upwardly of a drive wheel 9. In front of the seat 8 and between the seat and a front fork 12 for steering a steering wheel 11, is disposed a methanol tank 13. The methanol tank 13 is provided with a filler cap 14.

The hybrid system comprises a fuel cell in the fuel cell unit 7 and a battery in the battery unit 6 and is adapted to drive an electric motor in the electric motor unit 3 to rotate the drive wheel 9.

Figure 2A:
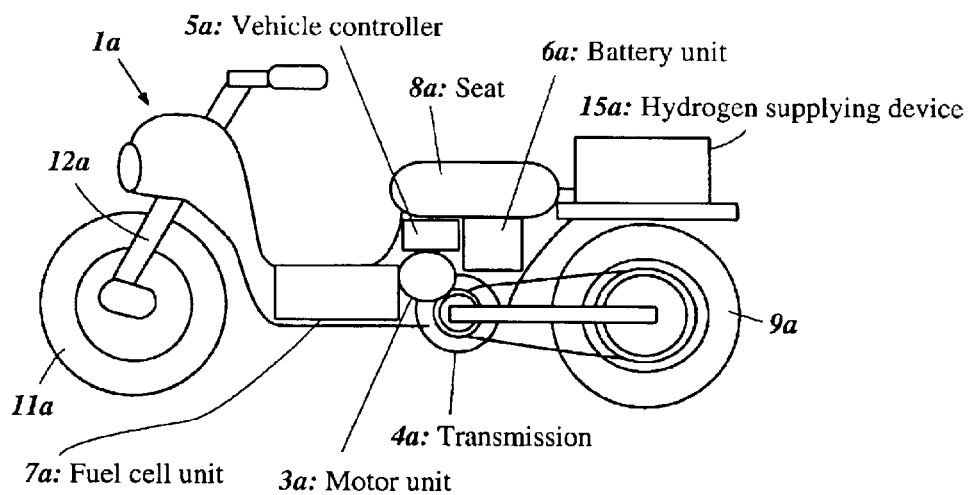
FIG. 2A is a side elevational view of a modification of the vehicle shown in FIG. 1, having a hydrogen supplying device.
Figure 2B:
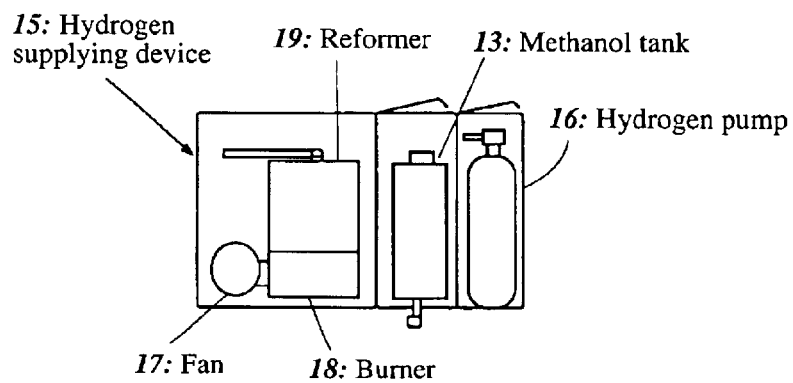
FIG. 2B is a schematic view o the hydrogen supplying device shown in FIG. 2A.

FIG. 2(A) illustrates a modification of the hybrid-driven motor bicycle 1 illustrated in FIG. 1, and FIG. 2(B) is a structural view of a hydrogen supplying device for the fuel cell.

The hybrid-driven vehicle 1 a has a vehicle controller 5a and a battery unit 6a under a seat 8a; under the vehicle controller 5a is provided an electric motor unit 3a; and in front thereof is provided a fuel cell unit 7a comprised mainly of a fuel cell. On a carrier to the rear of the seat 8a is provided a hydrogen supplying device 15a for supplying hydrogen for power generation to the fuel cell unit 7a.

The hydrogen supplying device 15, as shown in FIG. 2(B), is provided with a hydrogen tank 16 or "bomb" (i.e., a vessel for storing compressed hydrogen)together with a methanol tank 13, and with a fan 17 and a burner 18 for supplying combustion air, and further with a reformer 19 for producing hydrogen through catalyst, with primary fuel being heated and vaporized.

Figure 3:
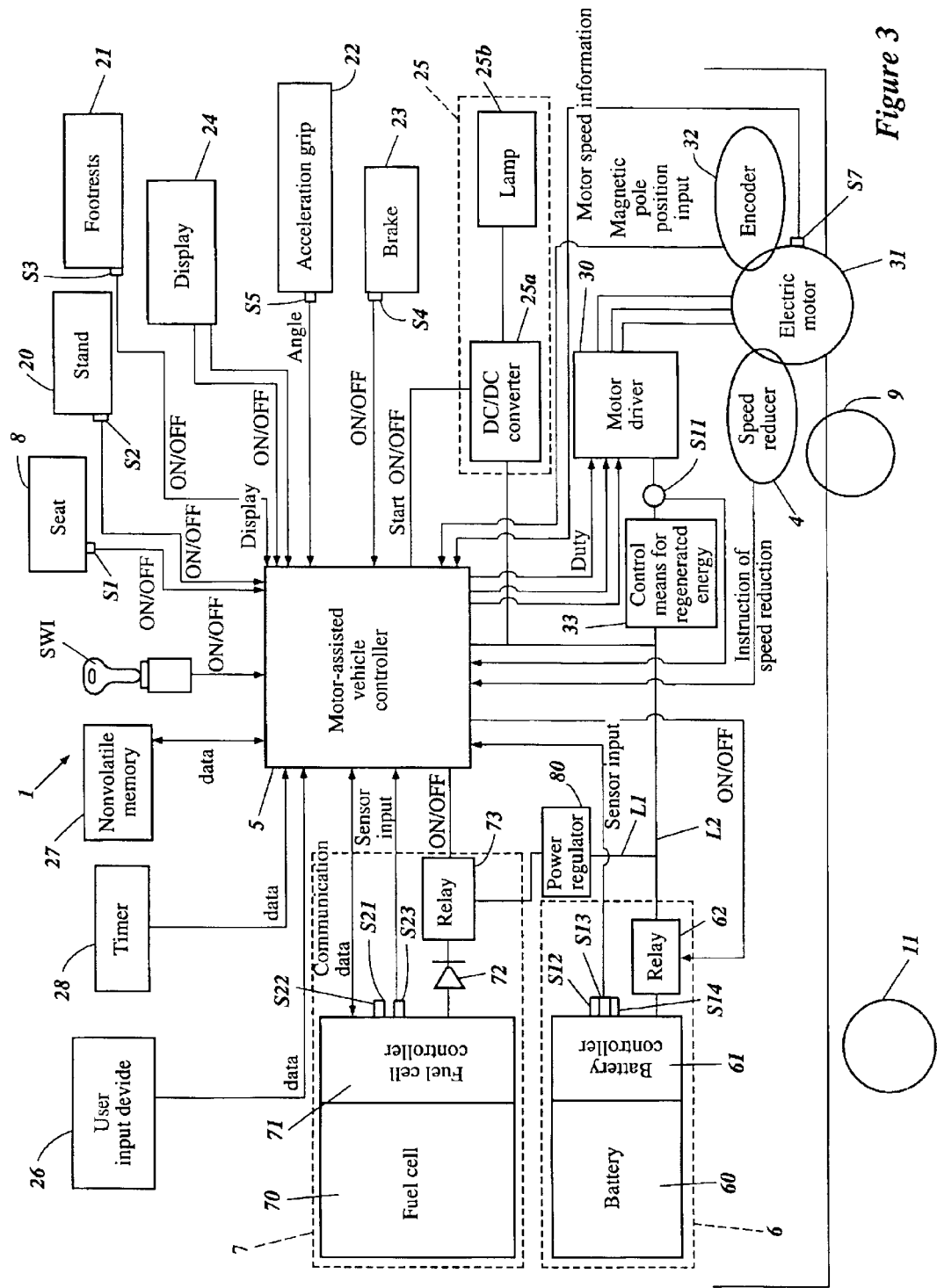
FIG. 3 is block diagram of a control system of the hybrid-driven vehicle according to the embodiment of this invention.

FIG. 3 is a schematic block diagram of the hybrid-driven vehicle according to this invention.

The hybrid-driven vehicle 1 is provided with a main switch SW1, a seat 8, a stand 20, a foot rest 21, an acceleration grip 22, a brake 23, a display 24, a lamp unit 25 including a light, a blinker, etc, a user input device 26, a non-volatile memory 27 and a timer 28, and further with an electric motor unit 3, a transmission 4, a vehicle controller 5, a battery unit 6 and a fuel cell unit 7.

ON/OFF signals are sent from the main switch SW1 to the vehicle controller 5 to drive the motor-powered vehicle. To the seat 8, stand 20, foot rest 21 and brake 23 are fitted sensors S1–S4, respectively. "ON/OFF" signals corresponding to seating/non-seating, use/non-use of the stand, feet-resting/non feet-resting and ON/OFF of the brake are sent from the respective sensors S1–S4 to the vehicle controller 5, where the respective operating conditions are detected.

The accelerator grip 22 includes output setting means. To the accelerator grip 22 is fitted an accelerator opening sensor S5, from which signals indicative of accelerator opening are sent to the vehicle controller 5 through a gripping manipulation of the user. The electric motor is controlled according to accelerator opening. The vehicle controller 5 includes control means for controlling the output of the electric motor based on the output setting value from the output setting means constituted by the accelerator grip 22.

The user is able to input various data from a user input device 26 to the vehicle controller 5 to change, for example, the operating characteristics of the vehicle. Also, data are transferred between the non-volatile memory 27, timer 28 and the vehicle controller 5. For example, data is stored to the non-volatile memory 27 regarding information on the operating conditions of the vehicle at a time when the vehicle stops, and the vehicle controller 5 reads the information on the stored operating conditions for control when operation is started or re-started.

The display 24 is driven by indicator-ON/OFF signals from the vehicle controller 5 and the operating conditions of the motor-powered vehicle are indicated on the display 24. The lamp unit 25 including a light, blinker, etc is comprised of lamps 25b of the light, blinker, etc. Activation-ON/OFF signals from the vehicle controller 5 drive a DC/DC converter 25a to light the lamps 25b.

The electric motor unit 3 is provided with a motor driver 30, an electric motor 31 connected to the drive wheel 9, an encoder 32, a regenerative current sensor S11 and regenerative energy control means 33. The motor driver 30 controls the electric motor 31 through duty signals from the vehicle controller 5, and the drive wheel 9 is driven by the output of the electric motor 31. The encoder 32 detects the position of the magnetic poles and the number of revolution of the electric motor 31. Information on the motor speed from the encoder 32 is stored in a memory in the motor driver 30 to be sent to the vehicle controller 5 as required. Output of the electric motor 31 is changed in its speed by the transmission 4 to drive the drive wheel 9. The transmission 4 is controlled by speed-change command signals from the vehicle controller 5. The electric motor 31 is provided with a motor voltage sensor or a motor current sensor S7, and information on the voltage and current of the motor is stored in a memory in the motor driver to be sent to the vehicle controller 5 as required.

The battery unit 6 is provided with a battery 60, a battery controller 61 and a battery relay 62. The fuel cell unit 7 is provided with a fuel cell 70 constituting power generating means, a fuel cell controller 71, a reverse current prevention element 72 and a fuel cell relay 73. There is also provided a first power supply path L1 allowing supply of the output current from the fuel cell 70 to the battery 60 and a second power supply path L2 allowing supply of the output current from the battery 60 to the electric motor 31. Electric power is supplied from the fuel cell through an electric power regulating section 80.

The battery controller 61 is provided with detection means for detecting the charging state of the battery 60. The detection means is comprised of a battery temperature sensor S12, a battery voltage sensor S13 and a battery current sensor S14. Information from these sensors is stored in a memory in the battery controller 61 to be entered in the vehicle controller 5 as required. The battery relay 62 is activated by ON/OFF signals from the vehicle controller 5 to control electric power supply from the second power supply path L2.

Communication data are sent from the vehicle controller 5 to the fuel cell controller 71. The fuel cell controller 71 controls the fuel cell 70 on the basis of the data from the controller 5. The fuel cell controller 71 is provided with detection means for detecting the state of the fuel cell 70. The detection means is comprised of various temperature sensors S21, a fuel cell voltage sensor S22 and a fuel cell current sensor S23. Information from these sensors is stored in a memory in the fuel cell controller 71 to be entered in the vehicle controller 5 as required. The fuel cell relay 73 is connected to the fuel cell controller 71 through the reverse current prevention element 72 which can be a rectifier diode, for example. The element 72 is activated by ON/OFF signals from the vehicle controller 5 to control electric power supply from the first power supply path L1.

Figure 4:
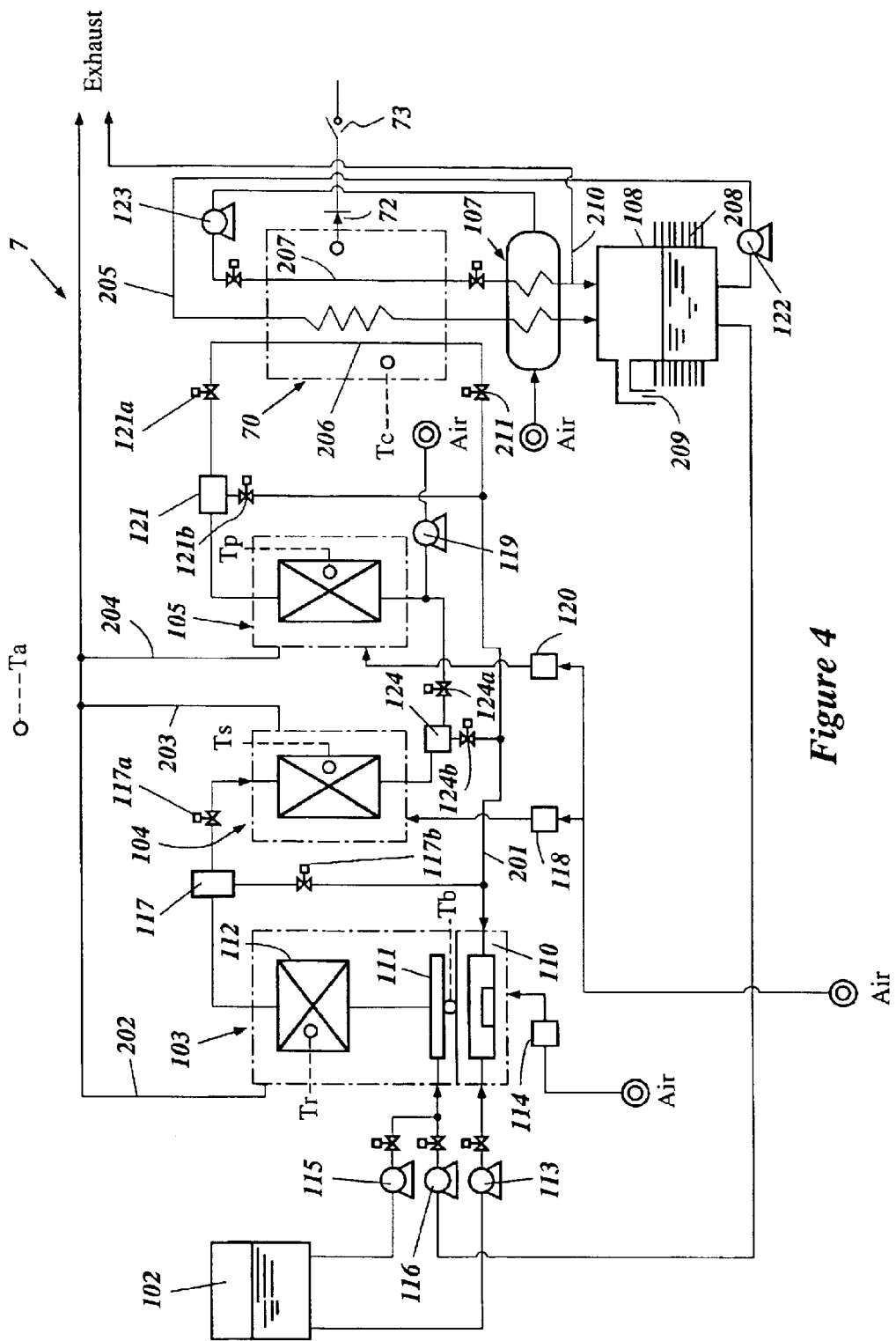
FIG. 4 is a structural diagram of a portion of a fuel cell unit included in the vehicle.

FIG. 4 is a structural diagram of a portion of a fuel cell according to an embodiment of this invention.

The fuel cell unit 7 in this embodiment comprises a methanol tank 102, a reformer 103, a shift converter 104, a selective oxidation reactor 105, a fuel cell 70, a moisture collecting heat exchanger 107, a water tank 108 and the fuel cell battery controller 71. The fuel cell controller 71 is connected to the devices such as valves, pumps and fans, and sensors. The reformer 103, shift converter 104, selective oxidation reactor 105 and fuel cell 70 are provided with temperature sensors Tr, Tb, Ts, Tp, and Tc. The temperature of these components is controlled by the fuel cell battery controller 71 (FIG. 3) through temperature detection.

The reformer 103 is provided with a burner 110, an evaporator 111 and a catalyst layer 112. To the burner 110, methanol is supplied from the methanol tank 102 by a burner pump 113. The burner pump 113 is activated through temperature detection by the temperature sensor Tb. Air from a burner fan 114, and the evaporator 111 is heated by combustion action of the mixture. The double circle in the figure represents an air inlet. Methanol is supplied to the evaporator 111 from the methanol tank 102 by the methanol pump 115. Water is fed from the water tank 108 by the water pump 116 and is mixed with the methanol therein. The burner 110 heats the evaporator 111 to vaporize the fuel mixture of methanol and water, and the vaporized fuel mixture in the evaporator 111 is supplied to the catalyst layer 112.

To the burner 110 is supplied surplus (or bypassing) hydrogen from the fuel cell 70 through a line 201 for combustion. The combustion heat of the burner 110 vaporizes primary fuel (raw material) composed of methanol and water, and heats the catalyst layer 112 to maintain its temperature at a value required for catalytic reaction. Combustion gas, and air not involved in the reaction, are discharged to the outside through an exhaust passage 202.

The catalyst layer 112 is made, for example, of Cu-base catalyst, and resolves the mixture of methanol and water into hydrogen and carbon dioxide at a catalyst reaction temperature of about 300° C. as follows:

$$CH_3OH + H_2O \rightarrow 3H_2 + CO_2$$

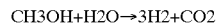

In the catalyst layer, a very small amount (about 1%) of carbon monoxide is produced:

$$CH_3OH \rightarrow 2H_2 + CO$$

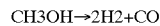

Since this CO is adsorbed by catalyst in the cell 70 and lowers electromotive force reaction, its concentration is lowered in the shift converter 104 and the selective oxidation reactor 105 in a latter stage, and in the cell 70, to the order of one thousand to some tens of ppm.

In the shift converter 104, carbon monoxide in the resolved gas is turned to CO2 at a reaction temperature of about 200° C. in the following chemical reaction by surplus water vapor:

$$CO + H_2O \rightarrow H_2 + CO_2$$

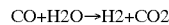

wherein CO concentration is lowered to the order of about 0.1%.

In the selective oxidation reactor 105, CO is further changed chemically to CO2 at a catalyst temperature of about 120° C. using platinum-base catalyst in the oxidation reaction as:

$$2CO + O_2 \rightarrow 2CO_2$$

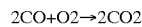

and its concentration is reduced further to 1/10 of the previous value or smaller. Thus, the CO concentration in the cell 70 can be lowered to the order of some tens of ppm.

The reformer 103 allows raw material to be reformed so as to produce hydrogen as described above, and the hydrogen acquired is supplied to the fuel cell 70 through the shift converter 104 and the selective oxidation reactor 105. A buffer tank 117 is provided between the reformer 103 and the shift converter 104 for absorbing pulsations and pressure changes caused by the switching of valves 117a, 117b. The hydrogen is returned to the burner 110 through activation of these switching valves 117a, 117b. The shift converter 104 is cooled by a cooling fan 118 in accordance with temperature detection by the temperature sensor Ts. Cooling air is discharged to the outside through an exhaust passage 203.

Between the shift converter 104 and the selective oxidation reactor 105 is provided a buffer tank 124 and switching valves 124a, 124b. Hydrogen is returned to the burner 110 through activation of these switching valves.

Hydrogen sent from the shift converter 104 is mixed with air fed by a reaction air pump 119 to be supplied to the selective oxidation reactor 105. The selective oxidation reactor 105 is cooled by a cooling fan 120 in accordance with temperature detection by the temperature sensor Tp. The cooling air is discharged to the outside through an exhaust passage 204.

Between the selective oxidation reactor 105 and the fuel cell 70 is provided a buffer tank 121 and switching valves 121a, 121b. Hydrogen is returned to the burner 110 in the reformer 103 through activation of these switching valves. As a result of the flow control achieved by the switching of valves 1171, 117b, 124a, 124b, 121a, 121b, the amount of hydrogen supplied to the fuel cell 70 can be regulated for electromotive force control. Excessive oxygen is supplied to the fuel cell 70 in this case, so that the electromotive force is controlled according to the amount of hydrogen supplied thereto.

Such an electromotive force control is performed as follows: required electromotive force is calculated by the vehicle controller 5 based on the data from sensors S21–S23 and the detected data on the operating conditions from other various sensors. The desired flow rate of each switching valve is calculated by the vehicle controller 5 or the fuel cell controller 71 based on the calculation results, taking account of the time lag required for the hydrogen quantity in the cell to be changed after activation of the switching valve, on the basis of which ON/OFF control or opening control of each switching valve is performed by the fuel cell controller 71. In this case, a larger supply quantity of the primary fuel such as methanol may increase the amount of evaporation of hydrogen to thereby increase the electromotive force, in which case time lag is produced by the time required for hydrogen to increase sufficiently enough to participate in power generation. Such a time lag is compensated by electric power from the battery.

To the fuel cell 70, water is supplied from the water tank 108 by a cooling and humidifying pump 122, and air is supplied from the moisture collection heat exchanger 107 by a pressurizing air pump 123 in accordance with temperature detection of the temperature sensor Tc. Using the water, air and hydrogen, power generation is performed in the fuel cell 70, as described below.

The fuel cell 70 is configured such that electrodes are each formed with, for example, a platinum-base porous catalyst layer (not shown) provided on both sides of a cell film (not shown) with a cooling and humidifying water passage 205 formed therein. To one electrode, is supplied hydrogen from the selective oxidation reactor 105 through a hydrogen passage 206. Oxygen (air) is supplied to the other electrode through an oxygen passage 207. Hydrogen ions move from the hydrogen passage 205 of the hydrogen side electrode to the oxygen side electrode through the cell film and are combined with oxygen to form water. The migration of electrons (−) associated with the migration of the hydrogen ions (+) allows the electromotive force to be generated between the electrodes.

This electromotive force generation is a heat development reaction, and for the purpose of cooling and smooth migration of hydrogen ions to the oxygen side electrode, water is supplied from the water tank 108 to the water passage 205 in the cell film between both electrodes by the pump 122. The water which has passed through the water passage 205 increases in temperature, exchanges heat with air in the heat exchanger 107 and returns to the water tank 108. The water tank 108 is provided with a radiation fins 208 for cooling water. Numeral 209 designates an overflow pipe.

Air is introduced to the heat exchanger 107. The air, after being heated by thermal communication with the water is supplied to the oxygen passage 207 by the air pump 123. As a result of the hot air being supplied, the combining reaction with hydrogen ions in the fuel cell 70 is accelerated, providing effective electromotive force reaction. Therefore, an air inlet (shown in the figure by a double circle) is preferably provided in the vicinity of the selective oxidation reactor 105 or the catalyst layer 112 where the foregoing high temperature catalytic reaction takes place.

Oxygen in the air passing through the oxygen passage 207 is combined with hydrogen ions is turned into water, and is collected in the water tank 108. The surplus air (oxygen and nitrogen) is discharged to the outside through an exhaust passage 210.

Water used in the fuel cell 70 and water produced by power generation as described above, exchanges heat with cooling air in the moisture collecting heat exchanger 107 and is returned to the water tank 108. Also, the surplus hydrogen used for power generation in the fuel cell 70 is returned to the burner 110 of the reformer 103 through a valve 211 and a line 201.

As described above, in the fuel cell unit 7, by means of the reformer 103 in which the evaporator 111 heated by the burner 110 and raw material vaporized by the evaporator 111 is supplied to the catalyst layer 112, the raw material is reformed to produce hydrogen. The hydrogen acquired is supplied to the fuel cell 70 through the shift converter 104 and the selective oxidation reactor 105 for power generation. In this case, hydrogen acquired from the selective oxygen reactor 105 may be stored, as shown in FIG. 2(B), temporarily in the hydrogen tank 16.

The output of the fuel cell 70, as shown in FIG. 3, is connected to the power regulating section 80 through the reverse current prevention element 72 and the fuel cell battery relay 73. The regulating section 80 is connected to the battery 60 and the electric motor 31.

Figure 5:
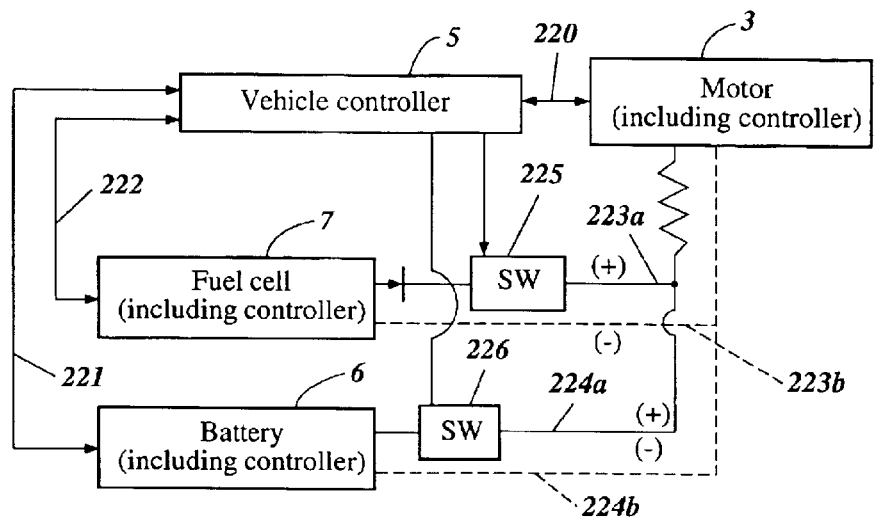
FIG. 5 is a structural diagram of a power source control system included in the vehicle.

FIG. 5 is a block diagram of the power source control system of the hybrid-driven vehicle 1, 1a according to this invention.

The vehicle controller 5 is connected to the electric motor unit 3, battery unit 6, and fuel cell unit 7 through bidirectional communication lines 220, 221, 222, respectively. The fuel cell unit 7 is connected to the electric motor unit 3 through a (+) side current line 223a and a (−) side current line 223b. On the (+) side current line 223a is provided a switch 225. This switch 225 is turned ON and OFF by the vehicle controller 5.

The battery unit 6 is connected to the electric motor unit 3 through a (+) side current line 224a and a (−) side current line 224b which are coupled to the (+) side current line 223a and (−) side current line 223b, respectively. On the (+) side current line 224a is provided a switch 226. This switch 226 is turned ON and OFF by the vehicle controller 5.

The electric motor unit 3 is a unit in which a controller (motor driver 30), an encoder and sensors, as well as an electric motor 31 (FIG. 3), are integrated together as a module. Such an electric motor unit 3 can be mounted detachably on a vehicle as a unitary component. Therefore, the bidirectional communication line 220 and the current lines 223a, 223b, 224a, 224b are each connected to the motor driver 30 as a controller of the electric motor unit 3 through the respective couplers (not shown).

The motor driver 30 has a memory, and detected data such as the operating conditions of the electric motor unit 3 (for example, number of revolutions), throttle opening, running speed, request load, temperature and shift position are sent to the vehicle controller 5 to update the memory in the vehicle controller 5 for storage.

The battery unit 6 is a unit in which a battery controller 61, sensors S12–S14 and a relay 52, as well as a battery 60 as shown in FIG. 3, are integrated together as a module. Such a battery unit 6 can be mounted detachably on a vehicle as a unitary component. Therefore, the bidirectional communication line 221 and the current lines 224a, 224b are connected to the battery controller 61 of the battery unit 6 through couplers (not shown).

The battery controller 61 has a memory, to which is stored data regarding the battery unit conditions such as temperature, voltage and current, and the residual capacity of the battery 60 while updated constantly. Thus, the data can be transferred through bidirectional communication between the battery controller and the vehicle controller to supply required power during running when the battery 60 is replaced, the residual capacity can be immediately recognized by the vehicle controller 5 for processing of expected travel distance, etc.

The fuel cell unit 7 is a unit in which a fuel cell controller 71, sensors S21–S23 (FIG. 3) and a relay 52, as well as the fuel cell 70, reformer, etc, are integrated together as a module. Such a fuel cell unit 7 can be mounted detachably on a vehicle as a unitary component. Therefore, the bidirectional communication line 222 and the current lines 223a, 223b are connected to the fuel cell controller 71 of the fuel cell unit 7 through couplers (not shown).

The fuel cell controller 71 has a memory, to which is stored data regarding the fuel cell unit conditions such as temperature, voltage and current, and the capacity (specifically, the residual fuel in the methanol tank) of the fuel cell while updated constantly. Thus, the data can be transferred through bidirectional communication between the fuel cell controller and the vehicle controller to supply required power during running, and processing of expected travel distance, etc, can be performed.

Although in the embodiment in FIG. 5, a fuel cell 70 and a battery 60 are used as two power supply sources constituting the hybrid-driven vehicle, two fuel cells or two batteries (second batteries) may be used, or an engine type generator or a capacitor may be used. In addition, this invention can be applied to watercrafts or other devices in addition to vehicles.

Figure 6:
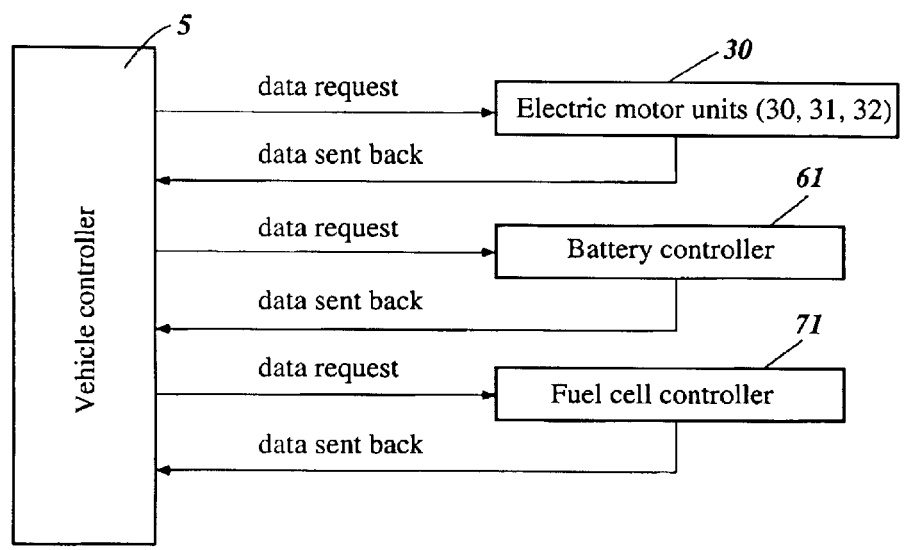
FIG. 6 is another illustration of the control system of the hybrid-driven vehicle.

FIG. 6 is an illustration of data communication in the control system of the hybrid-driven vehicle 11a according to yet another aspect of this invention.

The vehicle controller 5 transmits, to the electric motor unit 3 (motor driver (controller of the electric motor) 30, encoder 32 and other sensor group), battery controller 61 and fuel cell controller 71, request signals of various data stored in the memories of the controllers 30, 61, 71. In response, required data are sent back to the vehicle controller 5 from the sensor group of the electric motor unit 3, and the controllers 30, 61, 71. The contents of the data include information such as temperature, voltage, current, error information and capacity, and control information such as output request.

The vehicle controller 5 calculates, on the basis of the data from the sensor group and the controllers 30, 61, 71, the optimum amount of drive to the units, the data on the amount of drive are sent, as operation command data, to the motor driver 30 and controllers 30, 61, 71 for the control of the electric motor unit 3, battery unit 6 and fuel cell unit 7.

In such bidirectional data communication, according to the present aspect of the invention, when an abnormality occurs in the battery unit 6 or the fuel cell unit 7, the abnormality is detected by the battery controller 61 or the fuel cell controller 71, and the detection data regarding the abnormality is sent to the vehicle controller 5. The vehicle controller S determines accordingly whether the abnormality occurred in the battery unit 6 or the fuel cell unit 7, and cuts off the switch 225 or 226 (FIG. 5) of the power source where the abnormality is detected, to stop power supply from the abnormal power source to the motor. The switches 225, 226 can be the fuel cell relay 73 and the battery relay 62 of FIG. 3, respectively. The battery unit 6 is determined to be abnormal when the detection value of any of the battery temperature sensor S12, battery voltage sensor S13 and battery current sensor S14 is excessively large or small beyond the range of normal detection values which are stored as detection data on abnormality in the memory of the battery controller 61.

Similarly, the fuel cell unit 7 is determined to be abnormal when the detection value of any of the temperature sensor S21, fuel cell voltage sensor S22 and fuel cell current sensor S23 is excessively large or small beyond the range of normal detection values which are stored as detection data on abnormality in the memory of the fuel cell controller 71.

The vehicle controller 5 constantly sends to the controllers 61, 71 data requests including the detection data on abnormality, and if an abnormal state exists, the data is sent back to the vehicle controller 5. When the vehicle controller receives the detection data indicating an abnormality, the connection between the power source and the motor is cut off as described above.

If an abnormality is detected, the battery controller 61 or the fuel cell controller 71 that detected the abnormality, may send a request signal for stoppage of discharging of the abnormal battery or the fuel cell, to stop the use of the battery or the fuel cell. The vehicle controller 5 that has received the request signal for stoppage of discharging, determines whether the battery or the fuel cell needs to stop discharging, and cuts off the switch 225 or 226 of the abnormal power source to stop the use of the power source.

Such bidirectional communication of the detection data regarding abnormality allows a prompt action against such abnormalities at the time of occurrence of abnormality in the power source. In this case, even if the failure of the sensor itself is detected as an abnormality of the power source, it can be handled as an abnormal state.

Figure 7:
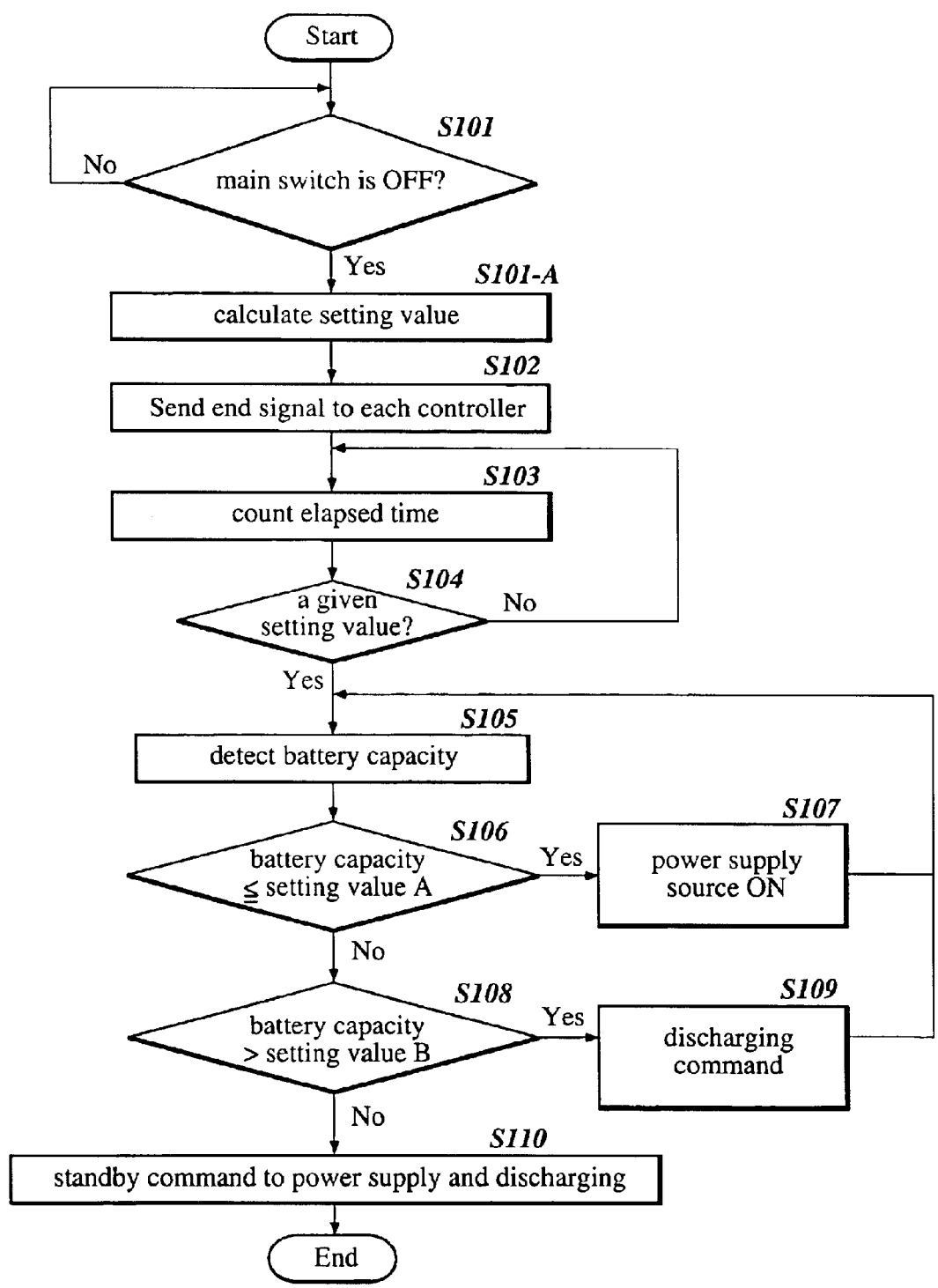
FIG. 7 is a flowchart illustrating a control subroutine for operation during standby of the hybrid-driven vehicle.
Figure 8:
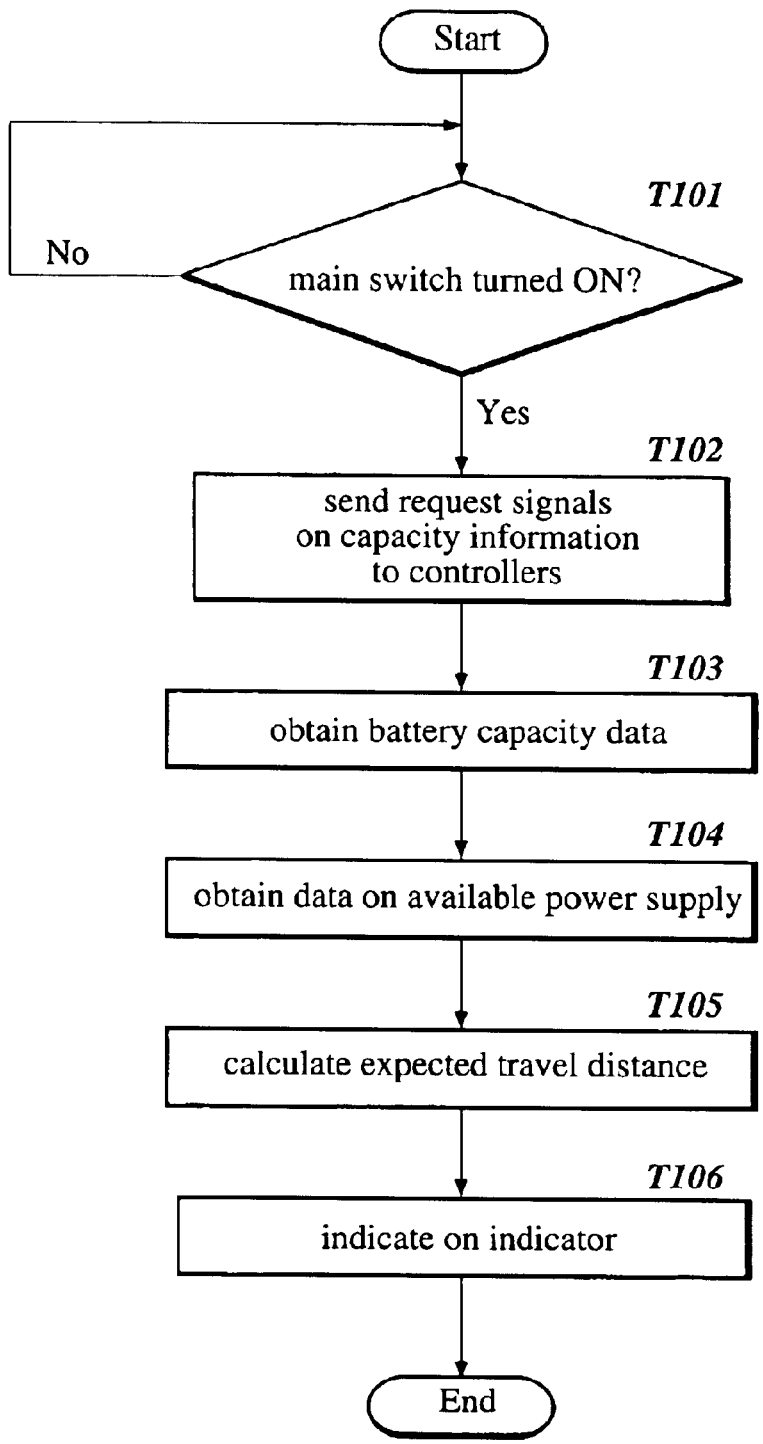
FIG. 8 is a flowchart illustrating a control subroutine for detection and calculation of the state of the power source in the hybrid-driven vehicle.

FIG. 7 is a flowchart of control of the power supply system during non-running of the hybrid-driven vehicle according to a further aspect of the invention.

The operation at each step is as follows:

S101: It is detected whether or not the main switch for power supply to the vehicle 1, 1a is OFF, to determine the end of use of the vehicle 1, 1a. If the vehicle 1, 1a is in use (in the state of running), necessary data communication is performed between the vehicle controller 5 and each controller 71, 61 of the fuel cell unit 7 and the battery unit 6, as shown previously in FIG. 6, for drive control of the vehicle 1, 1a according to the control program during running.

S101-A: a setting value of the timer count is determined based on the time of the next running and the current residual amount. That is, if the main switch SW1 is OFF, the timer is operated, and the need of discharging or charging is determined from the current battery capacity. Further, a length of time necessary for a discharging or a charging operation is calculated. A setting time is determined such that it is earlier than the time of the next running by the foregoing necessary length of time plus a margin (for example, a few to some tens of minutes). The time difference between the time of switching-off of the main switch and the setting time is calculated as a setting value.

S102: If the main switch is OFF, an end signal is sent from the vehicle controller to each controller of the motor unit 3, fuel cell unit 7 and battery unit 6.

S103: The elapsed time after switching-off of the main switch is counted by the timer.

S104: It is determined whether or not the elapsed time is a given setting value (the value calculated at Step S101-A). If it is less than the setting value, counting is continued till the setting value is reached.

S105: After the given setting time has elapsed since switching-off of the main switch SW1, the capacity of the fuel cell and the battery is detected. In this case, residual fuel in the methanol tank can be detected as an indication of the residual capacity of the fuel cell S106: The detected battery capacity is compared with a given setting value A. The setting value A is set to a minimum capacity required for smooth starting of the next running of the vehicle 1, 1a.

S107: If the battery capacity is not larger than the setting value A, the fuel cell unit 7 is operated through the fuel cell controller 71, to charge the battery 60 so that the battery capacity becomes larger than the setting value A.

S108: If the battery capacity is larger than the setting value A, the battery capacity is compared with a given setting value B.

S109: If the battery capacity is larger than the setting value B, a discharging command is sent to the battery controller, and the battery is discharged until the capacity reaches the setting value B.

S110: If the battery capacity is not larger than the setting value B (larger than the setting value A), the fuel cell 70 and the battery 60 are held on standby for starting of the next running of the vehicle 1, 1a.

Figure 9:
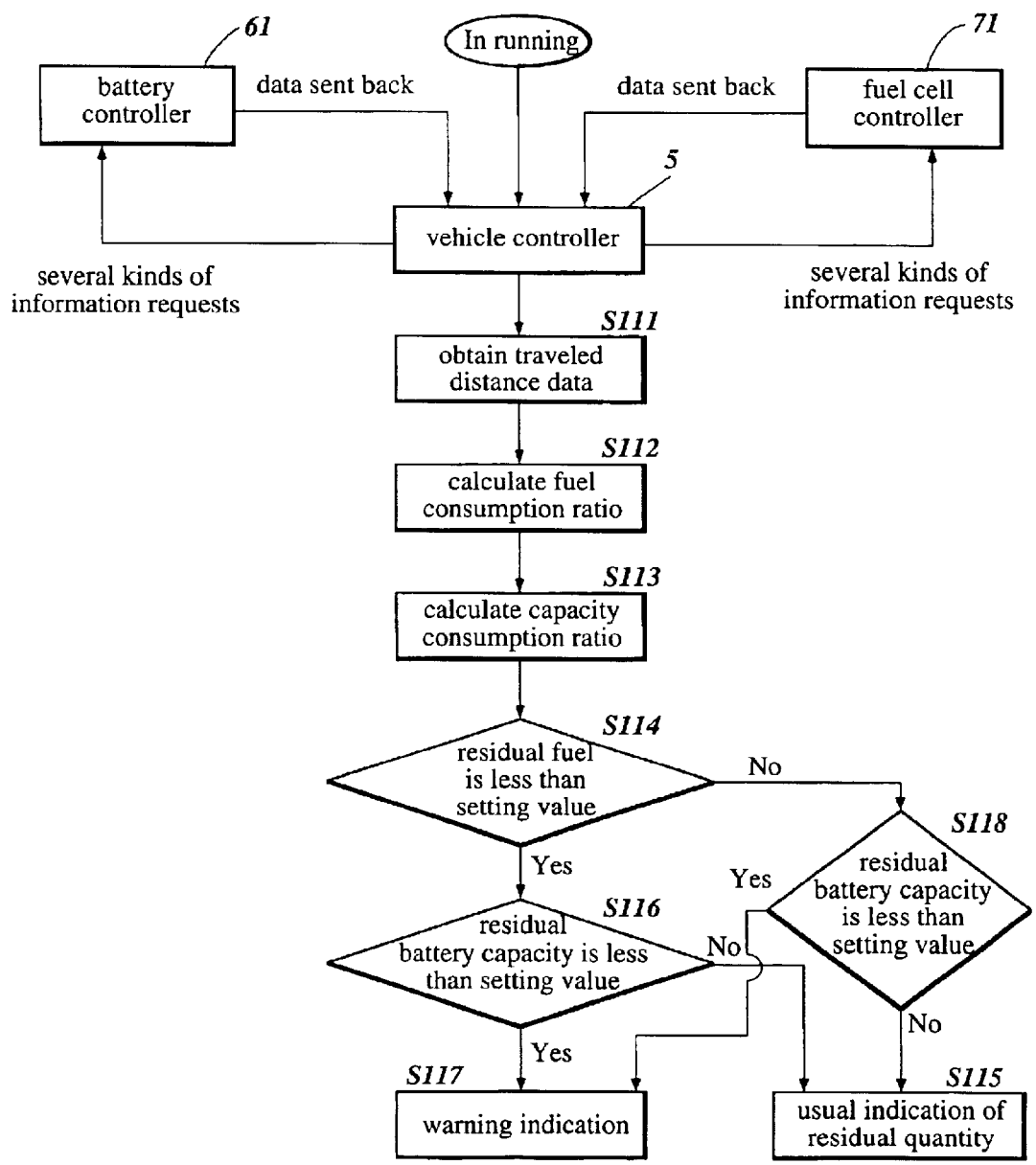
FIG. 9 is a flowchart illustrating a control subroutine for detection and its indication of the residual quantities of the power sources during running of the hybrid-driven vehicle.

As in FIG. 9, the vehicle controller 5 transmits or receives several kinds of data to or from the battery controller 61 and the fuel cell controller 71.

S111: Data regarding the distance traveled by the vehicle 1, 1a from the start of running is obtained. The data, which is detected by a distance detection sensor located on the axle (not shown), is written in a RAM (or non-volatile memory) of the battery controller 61 or the fuel cell controller 71, or in a RAM (or non-volatile memory) provided in the vehicle controller 5, for reading.

S112: The fuel consumption ratio is calculated on the basis of the data on the quantity of methanol fuel consumed from the start (difference between the current residual fuel in the methanol tank and the residual fuel at the start of operation) and the data regarding the traveled distance. This fuel consumption ratio is used to calculate the approximate vehicle range provided by the fuel cell 70.

S113: The capacity consumption ratio for the whole vehicle 1, 1a is calculated on the basis of the battery capacity data (the current battery capacity) and the traveled distance. This capacity consumption ratio is used to calculate the approximate vehicle range provided by the residual battery capacity and residual methanol.

The approximate vehicle range can be calculated by obtaining the data on the capacity consumption of the whole vehicle 1, 1a including the fuel consumption and the battery consumption, and calculating the capacity consumption ratio of the vehicle 1, 1a from this capacity consumption and the traveled distance.

For example, if the consumption ratio of the electric power supplier (fuel cell) is 100 cc/Ah and the capacity consumption ratio is 2.0 km/Ah, the approximate vehicle range in the case of the residual fuel of 3000 cc and the residual battery capacity of 5.0 A/h is:

(3000/100+5.0)×2.0=70 km.

S114: It is determined whether the residual methanol fuel in the fuel tank is not more than a given setting value.

S115: If the amount of methanol fuel is more than the given setting value, the residual quantity is displayed on a fuel indicator panel as usual.

S116: If the amount of methanol fuel is not more than the given setting value, it is determined whether the residual battery capacity is not more than the given setting value. If the residual battery capacity is more than the setting value, then at S115, the residual battery capacity is displayed on the indicator panel as usual, as well as the amount of the methanol fuel.

S117: If the residual quantity of the methanol fuel or the battery is not more than the respective given setting value, warning is indicated on the indicator panel.

S118: If the amount of fuel detected at S114 exceeds the setting value, it is determined whether the residual battery capacity is not more than the given setting value. If the residual battery capacity is not more than the setting value, warning is indicated (Step S117), and if it is more than the setting value, the residual quantity is indicated as usual (Step S115).

Figure 10:
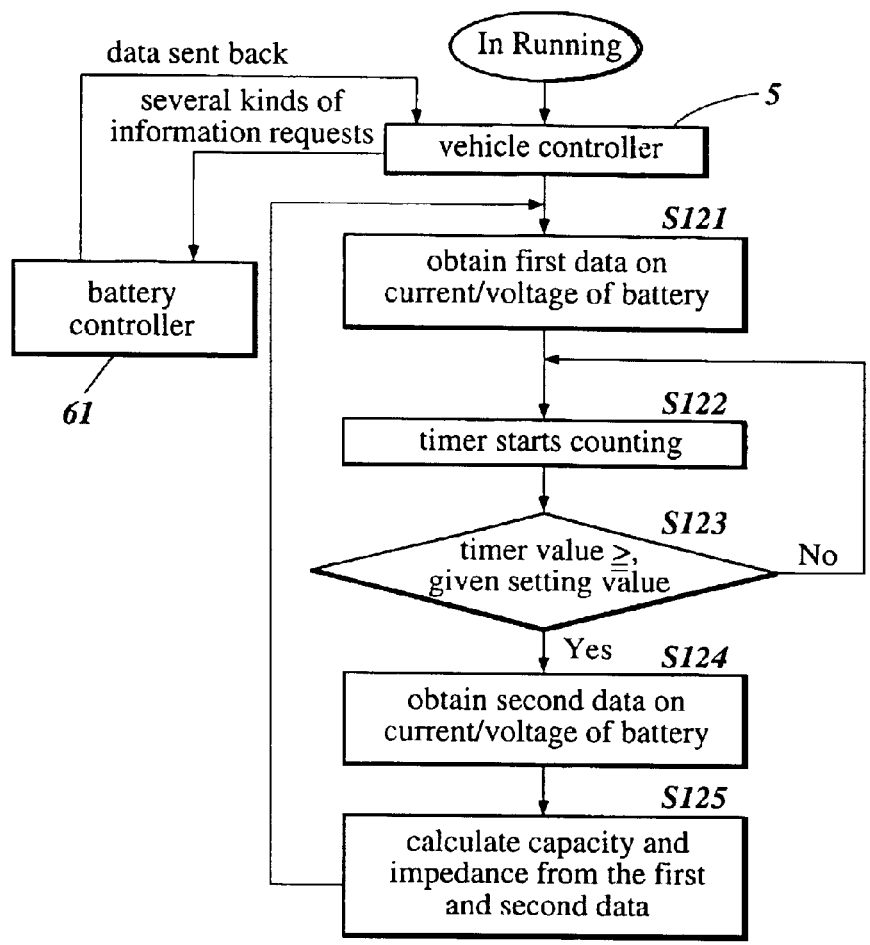
FIG. 10 is a flowchart illustrating a control subroutine for capacity control of the battery during running of the hybrid-driven vehicle.
Figure 11:
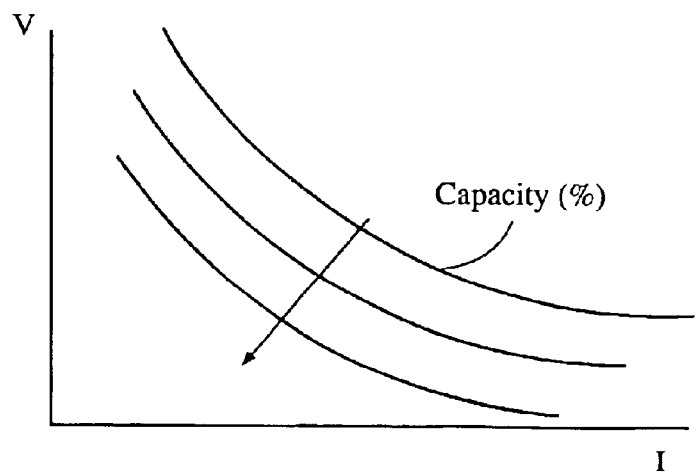
FIG. 11 is a graph of the capacity characteristics (percentage to the maximum capacity) corresponding to the current (I) and voltage (V) of the battery.

FIG. 10 is a flowchart of a preferred control subroutine for controlling the battery capacity during running. FIG. 11 is a graph of the capacity characteristics (percentage to the maximum capacity) corresponding to the current (I) and voltage (V) of the battery.

As described above, the vehicle controller 5 performs bidirectional data communication with the battery controller 61.

S121: The first detection data on the voltage and/or current of the battery is read from the battery controller 61 to be sent to the vehicle controller 5. The vehicle controller 5 stores the data on the capacity characteristics of FIG. 11, as a map beforehand in a ROM, etc. From the voltage or current data, the degree of consumption (percentage to the maximum capacity) of the battery capacity at a given time is found from the map in the graph of the capacity characteristics. This battery capacity changes, for example, over a certain time of use, as shown in the figure by the arrow.

S122: After the first data on the current and voltage is obtained, the timer begins counting.

S123: It is determined by the timer whether or not the given setting time is reached. Timer counting is continued until the setting time is reached.

S124: After the setting time has elapsed, the second data on the current and/or voltage of the battery is read from the battery controller 61 to be sent to the vehicle controller 5.

S125: The degree of consumption of the battery capacity is found from the graph of FIG. 11, based on the foregoing first data and the second data, and the impedance is calculated. The deterioration of the battery is determined from the impedance change.

Alternatively, during use of the battery, the current and voltage can be detected in an approximately constant current state generated by quick change over of the battery switch (FET, etc), and the residual battery capacity and the impedance may be calculated from the current and voltage characteristics in this constant current state.

Industrial Applicability

According to this embodiment as described above, as a result that the motor, fuel cell and battery are arranged as module units containing controllers, respectively, the efficiency of assembling and maintainability of modules are improved and control systems corresponding to the modules are integrated for the respective modules, thereby providing improved reliability of the control, easy parts replacement including that of the control system parts and improved applicability of modules with effective parts control.

In addition, if the device (vehicle) controller which controls the whole device is adapted to perform bidirectional data communication with the module controllers such as the motor, battery and fuel cell, then data is stored in each module controller and the device controller can receive requisite data on request to the module controller. Thus, the memory structure is simplified on the device controller side, and effective control can be performed using the same communication line for each module.

Further, if after a predetermined time has elapsed from the time the main switch is turned off, preparation processing is performed on the power supply sources such as the fuel cell and the battery, for the next operation. After the predetermined time has elapsed, the capacity of the fuel cell or the battery is detected so that it can be optimized sufficiently for normal operation. Once optimized, the device can be held on standby in an optimum condition for starting stably and reliably at the time of next running, for continued normal operation.

Furthermore, during operation, the available amount of power supply of each of the first and the second power source constituting the hybrid device, for example, residual capacity or residual fuel, is detected. The expected travel distance of the mobile body is calculated on the basis of the detected data Stable operation to the destination is verified and action can be taken when the expected travel distance or the residual quantity is insufficient.

Moreover, the use of an abnormal power source can be stopped promptly and operation is continued using the other power source while an appropriate action is taken against the abnormality, thereby minimizing damage.

What is claimed is:

1. A hybrid powered vehicle comprising a vehicle body, a propulsion unit configured to propel the vehicle body, a battery unit configured to supply sufficient power to the propulsion unit to propel the vehicle body, the battery unit comprising a battery configured to store electric power, a battery unit controller, a battery unit sensor configured to detect at least one operational characteristic of the battery and emit a signal including battery data indicative of the operational characteristic of the battery, and a battery unit memory configured to store the battery data, the battery unit being formed as integral unit, a fuel cell unit configured to supply sufficient power to the propulsion unit to propel the vehicle body, the fuel cell unit comprising a fuel cell configured to generate electrical power from a flow of fuel therethrough, a fuel cell unit controller, a fuel cell unit sensor configured to detect at least one operational characteristic of the fuel cell and emit a signal including fuel cell data indicative of the operational characteristic of the fuel cell, and a fuel cell unit memory configured to store the fuel cell data, the fuel cell unit being configured as an integral unit, and a main controller configured to selectively supply power from the battery unit and the fuel cell unit to the propulsion unit.

2. The vehicle according to claim 1 additionally comprising a first bidirectional data connection between the main controller and the battery unit controller and a second bidirectional data connection between main controller in the fuel cell unit controller.

3. The vehicle according to claim 1, wherein at least one of the fuel cell unit and the battery unit is removable from the vehicle as an integrated unit.

4. The vehicle according to claim 1, wherein the battery unit controller is configured to determine an amount of electrical power in the battery, the fuel cell unit controller being configured to determine an amount of electrical power available from the fuel cell, the main controller being configured to emit a warning signal if the amount of electrical power available from at least one of the battery unit and the fuel cell unit is below a predetermined amount.

5. The vehicle according to claim 1 additionally comprising a battery unit switch selectively connecting the battery unit with the main controller and a fuel cell unit switch selectively connecting the fuel cell unit with the controller, the main controller being configured to detect an abnormality in the battery unit and the fuel cell unit, and to operate at least one of the switches if an abnormality is detected in one of the battery unit and the fuel cell unit.

6. A hybrid-powered vehicle comprising a vehicle body, a propulsion device configured to propel the vehicle body, first and second power supply sources being different from each other, each power supply source being configured to supply sufficient power to drive the propulsion device, a controller configured to determine an amount of power available from each of the first and second power supply sources, the controller being configured to calculate an approximate travel range of the vehicle based on the amount of power available from the first and second power supply sources, wherein the first power source is a fuel cell and the second power source is a battery, the controller being configured to determine a fuel consumption ratio of the fuel cell and a capacity consumption ratio of the battery, the controller also being configured to determine the approximate travel range based on the fuel consumption ratio and the capacity consumption ratio.

7. The vehicle as set forth in claim 6, wherein the controller is configured to emit a warning if the approximate travel range is not more than a predetermined travel range.

8. The vehicle as set forth in claim 6 additionally comprising a memory including data regarding capacity of the battery corresponding to a current and a voltage of the battery, the controller being configured to calculate battery capacity based on the data and at least one of the current and voltage of the battery.

9. The vehicle as set forth in claim 8, wherein the controller is configured to obtain a first detection data regarding at least one of current and voltage of the battery and a second detection data regarding at least one of current and voltage of the battery after a predetermined time period has elapsed from when the first detection data was obtained.

10. The vehicle as set forth in claim 9, wherein the controller is configured to determine an impedance of the battery from the calculated capacity value based on the first and the second detection data.

11. A hybrid-powered vehicle comprising a vehicle body, a propulsion device configured to propel the vehicle body, first and a second power supply sources being different from each other, each power supply source being configured to supply sufficient power to drive the propulsion device, a controller configured to determine an amount of power available from each of the first and second power supply sources, the controller including means for calculating an approximate travel range of the vehicle based on the amount of power available from the first and second power supply sources, wherein the first power source is a fuel cell and the second power source is a battery, the means for calculating including means for determining a fuel consumption ratio of the fuel cell and a capacity consumption ratio of the battery, the means for calculating including means for determining the approximate travel range based on the fuel consumption ratio and the capacity consumption ratio.

12. The vehicle as set forth in claim 11, wherein the controller includes means for emitting a warning if the approximate travel range is not more than a predetermined travel range.

13. The vehicle as set forth in claim 11 additionally comprising a memory including data regarding capacity of the battery corresponding to a current and a voltage of the battery, the controller being configured to calculate battery capacity based on the data and at least one of the current and voltage of the battery.

14. The vehicle as set forth in claim 13, wherein the controller includes means for obtaining first and second detection data regarding at least one of current and voltage of the battery with a predetermined time period delay between obtaining the first and second detection data.

15. The vehicle as set forth in claim 14, wherein the controller includes means for determining an impedance of the battery from the calculated capacity value based on the first and the second detection data.

* * * * *

UNITED STATES PATENT AND TRADEMARK OFFICE
CERTIFICATE OF CORRECTION

PATENT NO. : 6,793,027 B1
DATED : September 21, 2004
INVENTOR(S) : Toshiaki Yamada et al.

It is certified that error appears in the above-identified patent and that said Letters Patent is hereby corrected as shown below:

<u>Title page, Item [54] and Column 1, line 1,</u>
Title, change "HYBRID DRIVE SYSTEM" to -- HYBRID-DRIVEN DEVICE. --.

Signed and Sealed this

Twenty-seventh Day of December, 2005

JON W. DUDAS
*Director of the United States Patent and Trademark Office*